United States Patent [19]
Rink et al.

[11] Patent Number: 5,964,479
[45] Date of Patent: Oct. 12, 1999

[54] ACETYLENE-BASED AIRBAG INFLATOR

[75] Inventors: Karl K. Rink, Liberty; David J. Green, Brigham; Michael Hepworth, North Ogden, all of Utah

[73] Assignee: Autoliv ASP, Inc., Ogden, Utah

[21] Appl. No.: 08/982,884

[22] Filed: Dec. 2, 1997

[51] Int. Cl.$^6$ ................................................... B60R 21/26
[52] U.S. Cl. ........................ 280/741; 280/736; 280/737
[58] Field of Search .................................. 280/737, 736, 280/741

[56] References Cited

U.S. PATENT DOCUMENTS

| | | |
|---|---|---|
| 651,132 | 6/1900 | Davis . |
| 1,056,560 | 3/1913 | Lippincott . |
| 1,805,721 | 5/1931 | Kogl . |
| 2,334,211 | 11/1943 | Miller . |
| 2,995,987 | 8/1961 | Fitzpatrick . |
| 3,664,134 | 5/1972 | Seitz . |
| 3,862,866 | 1/1975 | Timmerman et al. . |
| 5,060,973 | 10/1991 | Giovanetti . |
| 5,428,988 | 7/1995 | Starkovich . |
| 5,470,104 | 11/1995 | Smith et al. . |
| 5,494,312 | 2/1996 | Rink . |
| 5,496,062 | 3/1996 | Rink et al. . |
| 5,531,473 | 7/1996 | Rink et al. . |
| 5,669,629 | 9/1997 | Rink . |
| 5,713,595 | 2/1998 | Mooney et al. . |
| 5,806,885 | 9/1998 | Hock . |

*Primary Examiner*—Eric Culbreth
*Attorney, Agent, or Firm*—Sally J. Brown

[57] ABSTRACT

An inflator apparatus and method for inflating an inflatable device which rely on the formation and subsequent reaction of acetylene are provided.

22 Claims, 9 Drawing Sheets

ACETYLENE-BASED AIRBAG INFLATOR

CROSS REFERENCE TO RELATION APPLICATION

The subject matter of this application is related to prior application U.S. Ser. No. 08/632,698, filed on Apr. 15, 1996, now Rink, U.S. Pat. No. 5,669,629, issued Sep. 23, 1997.

BACKGROUND OF THE INVENTION

This invention relates generally to inflatable restraint systems and, more particularly, to an apparatus and method for inflating an inflatable device such as an inflatable vehicle occupant restraint airbag cushion, such as used in such systems.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as "inflator."

Many types of inflator devices have been disclosed in the art for inflating an inflatable restraint systems airbag cushion. Prior art inflator devices include compressed stored gas inflators, pyrotechnic inflators and hybrid inflators. Unfortunately, each of these types of inflator devices has been subject to certain disadvantages such as greater than desired weight and space requirements, production of undesired or non-preferred combustion products in greater than desired amounts, and production or emission of gases at a greater than desired temperature, for example.

In view of these and other related or similar problems and shortcomings of prior inflator devices, a new type an inflator, called a "fluid fueled inflator," has been developed. Such inflators are the subject of commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996, the disclosures of which are fully incorporated herein by reference.

Such an inflator device utilizes a fuel material in the form of a fluid, e.g., in the form of a gas, liquid, finely divided solid, or one or more combinations thereof, in the formation of an inflation gas for an airbag. In one such inflator device, the fluid fuel material is burned to produce gas which contacts a quantity of stored pressurized gas to produce inflation gas for use in inflating a respective inflatable device.

The proper storage of a fuel material together with a corresponding oxidant can be difficult, especially over prolonged period of times such as may be associated with inflatable restraint systems in automotive vehicles, which systems require a responsive lifetime which extends for a period of years. Also, while the separate storage of the fuel and oxidant can alleviate or reduce some such storage concerns, the complexity of the design and manufacture of an inflator providing such separate storage of fuel and oxidant can be more complicated and costly than desired.

While the above-identified fluid fueled inflators avoid or minimize at least some of the above-identified shortcomings of prior inflator devices, there remains a need for an inflator device which satisfies one or more of the following objectives: increased simplicity of design and construction; avoids or minimizes the risks or problems associated with the storing, handling and dispensing of various and selected gas generant materials; and permits even further reductions in assembly weight.

The above-identified related prior application, now patent Rink, U.S. Pat. No. 5,669,629, issued Sep. 23, 1997, discloses and claims airbag inflation gas generation via a decomposing material and specifically discloses acetylene ($C_2H_2$) as one decomposable material useable therein.

In the past, acetylene has been used as a fuel material in various industrial applications including, for example, welding and metal cutting. Advantageous thermodynamic and physical properties of acetylene, such as a relatively high calorific content (1307 kJ/mol) and flame temperature (3300° C. in oxygen), make acetylene particularly well suited for such applications. At relatively low pressures (e.g., at pressures as low as about 25 psi), however, acetylene is generally unstable, thus generally rendering the use of acetylene more difficult and typically necessitating the taking of special precautions relative to the handling and use thereof. For example, pure acetylene stored at pressures above about 25 psi is susceptible to reaction, even in the absence of an oxidant. As a result, acetylene is commonly stored absorbed in acetone which, in turn, is held in cylinders filled with a porous filler material.

Thus, an airbag inflator device and method for inflating an inflatable device which at least either simplifies or facilitates the use therein of one or more fuel materials, such as acetylene, such as by avoiding or minimizing the risks normally associated with the storage or handling of the fuel material, have been desired and are sought.

SUMMARY OF THE INVENTION

A general object of the invention is to provide an improved apparatus and method for inflating an inflatable device.

A more specific objective of the invention is to overcome one or more of the problems described above.

The general object of the invention can be attained, at least in part, through an apparatus for inflating an inflatable device, which apparatus includes a first chamber containing a supply of calcium carbide and a supply of water. In this chamber, at least a portion of the supply of calcium carbide and at least a portion of the supply of water react to form acetylene when the apparatus has been actuated. At least a portion of the formed acetylene in turn reacts to produce at least one gaseous product species. At least a portion of the at least one gaseous product species is released from the first chamber for inflating the inflatable device.

The prior art fails to provide an inflator device of as simple as desired design and construction, which avoids or minimizes the risks or problems associated with the storing, handling and dispensing of various and selected gas generant materials; and permits as great as desired reductions in assembly weight. More particularly, the prior art fails to provide an airbag inflator device and method for inflating an inflatable device which at least either simplifies or facilitates the use of a fuel material such as acetylene therein, such as by avoiding or minimizing the risks normally associated with the storage or handling of such a fuel material, to as great an extent as may be desired.

The invention further comprehends a method for inflating an inflatable safety device. Such a method includes the steps of:

reacting calcium carbide and water in a first chamber of an inflation apparatus to form acetylene, reacting at least a portion of the formed acetylene to produce at least one gaseous product species, and releasing at least a portion of the at least one gaseous product species from the inflation apparatus to inflate the inflatable safety device.

As used herein, references to "combustion," "combustion reactions" and the like are to be understood to generally refer to the exothermic reaction of a fuel with an oxidant.

References to "decomposition," "decomposition reactions" and the like are to be understood to refer to the splitting, dissociation or fragmentation of a single molecular species into two or more entities.

"Thermal decomposition" is a decomposition reaction controlled primarily by temperature. It will be appreciated that while pressure may, in a complex manner, also influence a thermal decomposition such as perhaps by changing the threshold temperature required for the decomposition reaction to initiate or, for example, at a higher operating pressure change the energy which may be required for the decomposition reaction to be completed, such decomposition reactions remain primarily temperature controlled.

"Exothermic thermal decomposition" is a thermal decomposition which liberates heat.

The term "equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi=(F/O)_A/(F/O)_S$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

References to inflator or inflation gas "output" are to be understood to refer to inflator performance output parameters such as the quantity, supply, and rate of supply of inflation gas. With adaptive output inflators, the inflator output is generally dependent on selected operating conditions such as ambient temperature, occupant presence, seat belt usage and rate of deceleration of the motor vehicle, for example.

Other objects and advantages will be apparent to those skilled in the art from the following detailed description taken in conjunction with the appended claims and drawings.

BRIEF DESCRIPTION OF THE DRAWINGS

Each of FIGS. 1–5 are simplified, partially in section schematic drawings of acetylene-based airbag inflators in accordance with alternative embodiments of the invention.

DETAILED DESCRIPTION OF THE INVENTION

Figure 1:
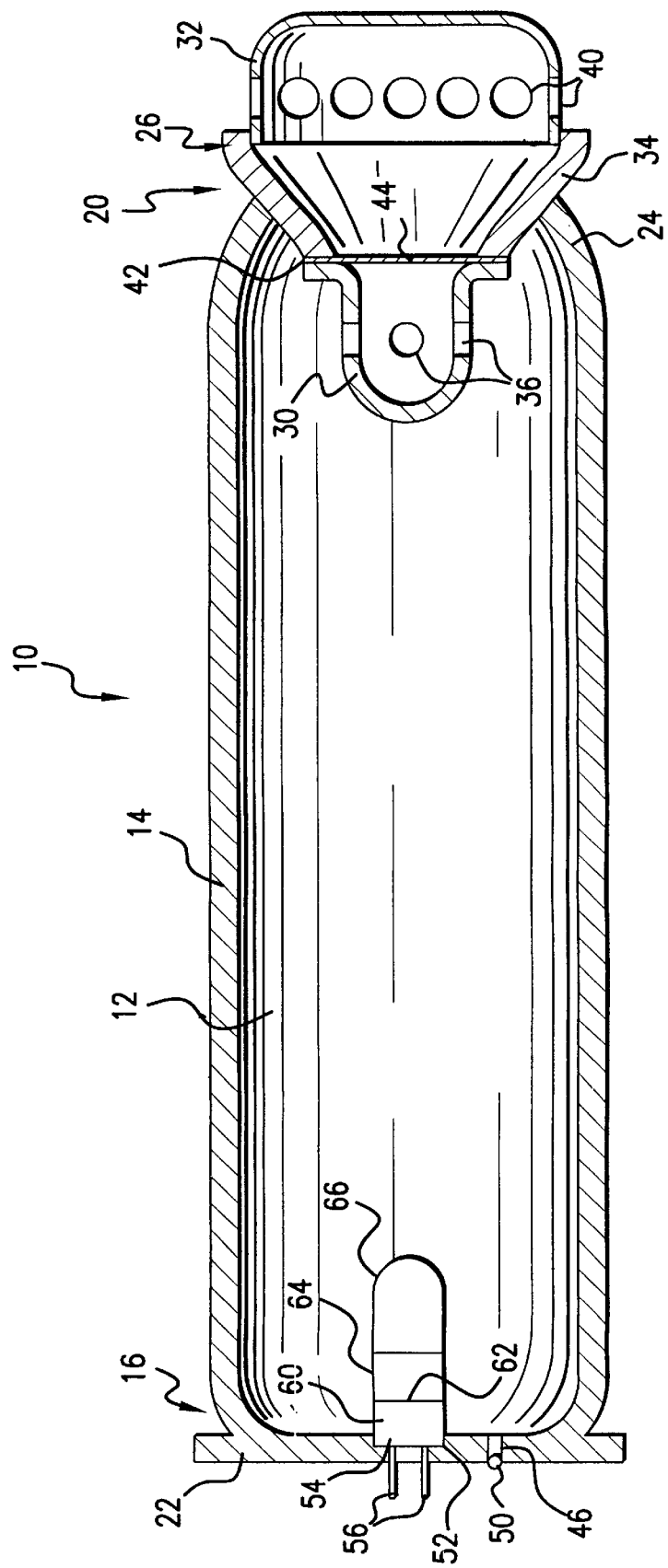

Referring initially to FIG. 1, there is illustrated an acetylene-based passenger side airbag inflator 10, in accordance with one embodiment of the invention. It will be understood that the invention described hereinafter has general applicability to various types or kinds of airbag assemblies including driver side, passenger side, and side impact airbag assemblies for various kinds or types of vehicles such as automotive vehicles including vans, pickup trucks, and particularly automobiles.

The inflator assembly 10 includes a chamber 12, which as described in greater detail below, contains a supply of oxidant or oxidant-bearing gas. The chamber 12 is defined in part by an elongated generally cylindrical sleeve 14 having a first and a second end, 16 and 20, respectively. The first end 16 is closed by means of an end base 22 formed integrally (i.e., continuous with and in one piece) with the sleeve 14. The second end 20 is partially closed by means of an integral shoulder portion 24. A diffuser assembly 26 is attached in sealing relation to the shoulder portion 24 at the sleeve second end 20.

The diffuser assembly 26 includes a throttle portion 30 and a discharge end portion 32 joined together by means of a diffuser body portion 34. The throttle portion 30 includes a plurality of openings 36 which permit the passage of contents from the chamber 12 into the diffuser assembly 26. The diffuser discharge end portion 32 also includes a plurality of openings 40 for dispensing and directing inflation gas from the inflator assembly into an airbag assembly (not shown).

The diffuser throttle portion 30 and the diffuser body portion 34 form an interface 42 closed by sealing means, such as by means of a burst disc 44 therebetween, for example. In the static state, the burst disc 44 serves to separate the contents of the chamber 12 from the airbag.

The end base 22 includes a first opening 46, sometimes referred to herein as a "fill port," wherethrough fluid can be passed into the chamber 12. As shown, in the completed assembly, the fill port opening 46 can be appropriately sealed or closed such as by means of a plug 50, such as known in the art.

As identified above, the chamber 12, in the at rest state, contains a supply of oxidant or oxidant-bearing gas. Oxidants useable in the invention include various oxygen-containing gases including, for example, pure oxygen, air, diluted air, oxygen combined with one or more gas diluents such as nitrogen, carbon dioxide, and noble gases such as helium, argon, xenon as well as nitrous oxide either alone or similarly combined with one or more gas diluents and noble gases.

In practice, the use of pure oxygen ($O_2$) may be disadvantageous for a number of reasons including: 1) from a production viewpoint, such use may present handling difficulties, 2) such use can magnify autoignition difficulties, 3) when combined with the proper amounts of fuel (stoichiometric or near stoichiometric, $0.8 \leq \phi \leq 1.2$), extremely high flame temperatures can result (especially at the elevated pressures commonly associated with such inflator designs, and 4) at equivalence ratios of less than 0.8, excess quantities of oxygen and carbon monoxide can cause concern.

In view thereof, mixtures of argon and oxygen may be preferred. Argon advantageously is relatively: 1) inert, 2) inexpensive, 3) safe, and 4) easy to handle. The preferred relative amounts of the components of such a mixture will in general be dependent on factors such as the inflator geometry and the particular fuels used therein. For example, an oxidant mixture of 50–65 vol % oxygen with the balance being argon can advantageously be used with ethyl alcohol-based fuel-containing assemblies.

It will also be appreciated that such oxidant mixtures can be used in conjunction with minor amounts of air, such as may be initially present in the chamber to be filled with oxidant, prior to the addition of the oxidant therein.

In the practice of the invention, such oxidant or oxidant-bearing gas and mixtures will generally be of a pressure in the range of about 500 to about 3000 psia (about 3.45 to about 20.7 MPa), preferably in the range of about 1000 to about 2000 psia (about 6.9 to about 13.8 MPa). Further, as described above, the oxygen can be mixed with an inert gas. In addition, the use of an oxidant mixture containing about 35 to 65% oxygen, about 2 to 15% helium, and with the balance constituting one or more inert gas (such as helium, argon, and nitrogen), either alone or in various relative amounts can be advantageous. For example, an oxidant mixture of about 60% oxygen, about 32% argon and about 8% helium can result in improved hot, cold and/or ignition delay performance as well as facilitate, during the manufacturing process, the detection of leaks from the device.

The end base 22 also includes a second opening 52, wherethrough an initiator device 54 is attached in sealing relation to the chamber 12 such as by means (not shown) of an O-ring, crimping or other suitable hermetic seal. In general, the initiator device can be of any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a pyrotechnic charge. In practice, however, a relatively large heat input such as from the initiator, may be helpful in obtaining a more thorough initiation the desired reaction of the produced acetylene. In view thereof, as pyrotechnic charge-containing initiators can typically more easily produce such relatively large heat inputs from a relatively small sized initiator device, the practice of the invention with such initiators can be particularly advantageous.

The initiator device 54 includes leads 56 and a body portion 60 having a discharge end or portion 62 wherefrom, upon receipt of an appropriate electrical signal, such a pyrotechnic charge-containing initiator device will emit a hot, particle-laden discharge.

Within the chamber 12, nearby or preferably adjacent the initiator device discharge end 62, there is a first storage container 64 wherein is housed a supply of calcium carbide. Nearby or preferably adjacent the first storage container 64, generally opposite the initiator device discharge end 62, there is a second storage container 66 wherein is housed a supply of water. It will be appreciated that such calcium carbide and water storage containers may, for example, be in the form of separated or joined structures or a one piece structure, as may be desired.

In operation, such as upon the sensing of a collision, an electrical signal is sent to the initiator device 54. The initiator device 54 functions and, when it is a pyrotechnic charge-containing initiator, discharges high temperature combustion products towards the first storage container 64, resulting in the rupturing or opening thereof and the release of stored calcium carbide therefrom. As a result of the discharge of high temperature combustion products from the initiator device 54 and/or the rupturing or opening of the first storage container 64, the second storage container 66 also ruptures or opens thereby releasing stored water therefrom.

The released calcium carbide and released water react to form acetylene, such as via the reaction mechanism detailed below:

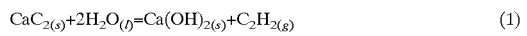

$$CaC_{2(s)} + 2H_2O_{(l)} = Ca(OH)_{2(s)} + C_2H_{2(g)} \qquad (1)$$

The acetylene so produced contacts and mixes with the oxidant contained within the chamber 12. Either alone, such as through the unstable nature of acetylene described above such as results in the decomposition thereof, or as a result of input of residual heat from the discharge of the initiator device 54 wherein the acetylene and oxidant combination is ignited and burned, at least a portion of the formed acetylene reacts to produce a quantity of at least one gaseous product species and results in a rapid pressure rise within the chamber 12.

It will be appreciated that the unstable nature of acetylene can be utilized via at least several different techniques to result in the reaction thereof. For example, the generated or produced acetylene can be released into an environment having a pressure in excess of auto-decomposition pressure of acetylene, e.g., a gas pressure in excess of about 25 psi, resulting in the reaction thereof and the production of at least one corresponding gaseous product species.

When the gas pressure within the decomposition chamber 12 exceeds the structural capability of the burst disc 44, the disc ruptures or otherwise permits the passage of the inflation gas through the diffuser assembly 26 and out the diffuser discharge openings 40 into the associated airbag assembly.

Thus, the invention provides an inflator device and associated method for inflating an inflatable device of increased simplicity of design and construction; avoids or minimizes the risks or problems associated with the storing, handling and dispensing of conventional gas generant materials; and permits assembly weight reductions. More specifically, the invention provides an airbag inflator device and method for inflating an inflatable device wherein a fuel material, e.g., acetylene, is formed or generated internally within an inflator at or near the time of use. Thus, the invention at least either simplifies or facilitates the use of a fuel material such as acetylene therein, such as by avoiding or minimizing the risks normally associated with the storage or handling of such fuel material.

Figure 2:
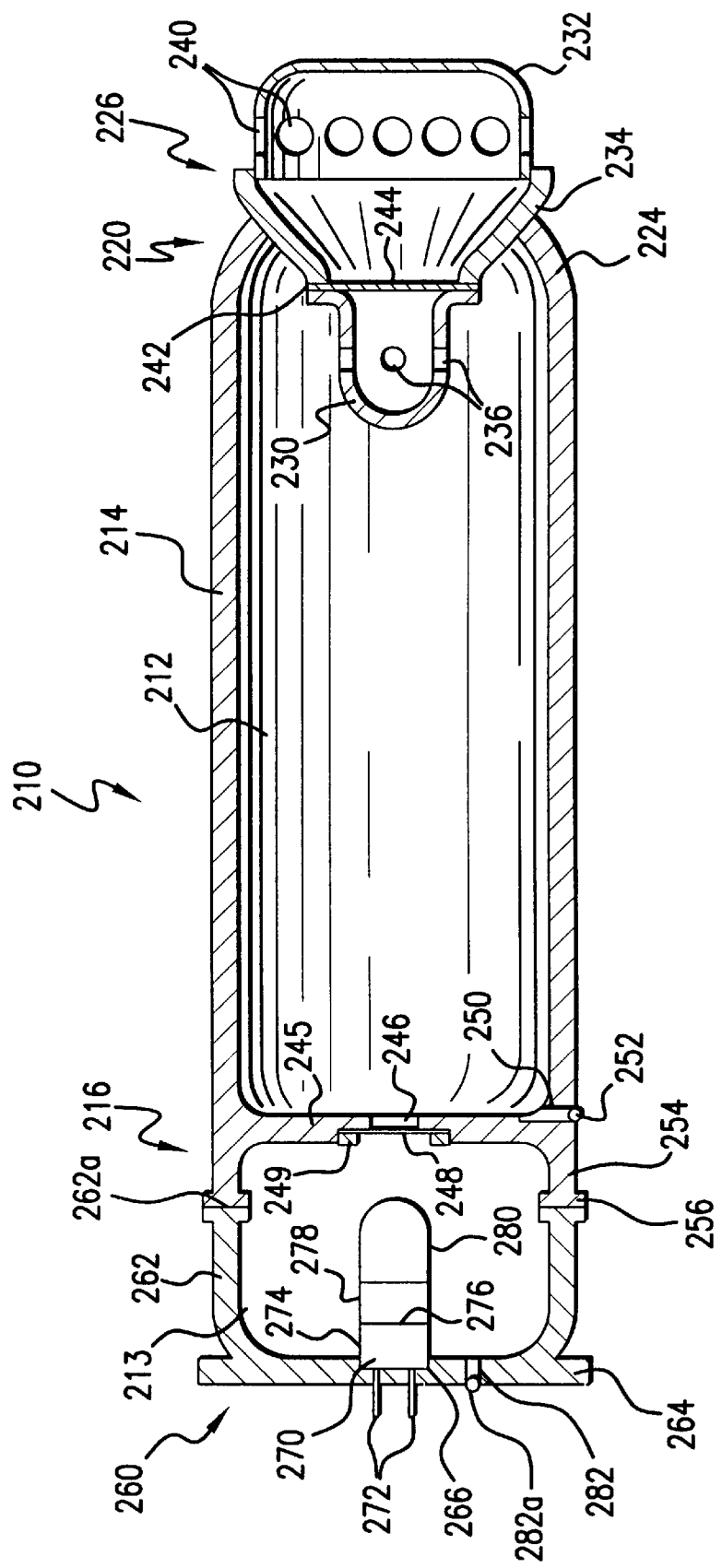

FIG. 2 illustrates an acetylene-based passenger side airbag inflator 210, in accordance with a second embodiment of the invention. The inflator assembly 210 includes a first chamber 212 and a second chamber 213. The first chamber 212 is filled and pressurized with an inert gas such as argon or nitrogen or a mixture of such inert gases to a pressure typically in the range of 2000–5000 psi. Thus, the chamber 212 is sometimes referred to herein as a "gas storage chamber." As will more fully be described below, the second chamber 213 is sometimes referred to as a "reaction chamber."

The chamber 212 is defined by an elongated generally cylindrical sleeve 214, having a first end 216 and a second end 220. The second end 220 is partially closed by means of a shoulder portion 224. As shown, the shoulder portion 224 can desirably be integral (i.e., formed continuous with and in one piece) with the sleeve 214.

A diffuser assembly 226 is attached in sealing relation to the shoulder portion 224 at the sleeve second end 220. The diffuser assembly 226 is generally similar to the diffuser assembly 26, described above relative to the inflator assembly 10, and includes a throttle portion 230 and a discharge end portion 232 joined together by means of a diffuser body portion 234. As with the above-described diffuser assembly 26, the throttle portion 230 and the diffuser discharge end portion 232 each include a plurality of openings, 236 and 240, respectively.

At the interface 242 between the diffuser throttle portion 230 and the diffuser body portion 234, a burst disc 244 serves, in the static state, to separate the contents of the chamber 212 from the associated airbag (not shown).

Adjacent the sleeve second end 216, a radially extending end wall 245 serves to provide partially closure to that end of the sleeve. The end wall 245 includes an opening 246 therein. The opening 246 is normally closed by sealing means, e.g., by means of a burst disc 248 secured and joined thereto in sealing relation such as is known in the art. As shown, the securing of the burst disc 248 can be facilitated through the use of a burst disc retainer 249 as is also known in the art. In the illustrated embodiment, the end wall 245 is integral, i.e., formed in one piece, with the sleeve 214. It is to be appreciated that while a separate piece constituting such an end wall could be used and joined to the sleeve, the integral formation of the end wall can simplify manufacture and reduce the possibility of undesired leakage from the inflator assembly.

The sleeve 214 includes an opening 250 which serves as a fill port wherethrough fluid can be passed into the chamber 212. As in the above-described embodiment, in the completed assembly, the fill port opening 250 can be appropriately sealed or closed such as by means of a plug 252, such as known in the art.

The second chamber 213 is at the sleeve first end 216. At the end 216, the sleeve 214 includes a portion 254 extending axially beyond the end wall 245. The extending portion 254 includes an end surface 256. The chamber 213 is an assembly formed by the joining together of the portion 254 with a combustion cup 260 which includes a generally cylindrically extending side wall 262 and a base wall 264. The end surface 262a of the side wall 262 is joined in sealing relation, such as by means of a weld, with the extending portion end 256.

The base wall 264 includes an opening 266 therein, wherethrough an initiator device 270, such as described above, is attached in sealing relation, such as with a weld, crimping or other suitable hermetic seal, within the chamber assembly 213.

The initiator device 270 includes leads 272 and a body portion 274 having a discharge end or portion 276 wherefrom, upon receipt of an appropriate electrical signal, such a pyrotechnic charge-containing initiator device will emit a hot, particle-laden discharge.

Within the chamber 213, adjacent the initiator device discharge portion 276, there is a storage container 278 wherein is housed a supply of calcium carbide. Adjacent the storage container 278, generally opposite the initiator device discharge portion 276, there is a storage container 280 wherein is housed a supply of water. It will be appreciated that such calcium carbide and water storage containers may, for example, be in the form of separated or joined structures or a one piece structure, as may be desired.

The base wall 264 includes an opening 282 which serves as a fill port wherethrough fluid can be passed into the chamber 213. As shown, in the completed assembly, the fill port opening 282 is appropriately sealed or closed such as by means of a plug 282a, such as known in the art.

The chamber 213, similar to the chamber 12 of inflator assembly 10 shown in FIG. 1, in the at rest state, contains a supply of oxidant or oxidant-bearing gas, such as described above.

In operation, such as upon the sensing of a collision, an electrical signal is sent to the initiator device 270. The initiator device 270 functions and, when it is a pyrotechnic charge-containing initiator, discharges high temperature combustion products towards the first storage container 278, resulting in the rupturing or opening thereof and the release of stored calcium carbide therefrom. As a result of the discharge of high temperature combustion products from the initiator device 270 and/or the rupturing or opening of the first storage container 278, the second storage container 280 also ruptures or opens thereby releasing stored water therefrom.

The released calcium carbide and released water react to form acetylene, with residual heat resulting from the discharge of the initiator device 270 igniting acetylene so produced, resulting in a rapid pressure rise within the reaction chamber 213.

When the gas pressure within the reaction chamber 213 exceeds the structural capability of the burst disc 248, the disc ruptures or otherwise permits the passage of the reaction products into the gas storage chamber 212.

When the gas pressure within the gas storage chamber 212 exceeds the structural capability of the burst disc 244, the disc ruptures or otherwise permits the passage of heated and hence expanded stored gas as well as reaction products or other material passed into the gas storage chamber 212 from the reaction chamber 213 through the diffuser assembly 226 and out through the diffuser discharge openings 240 into the associated airbag assembly.

It will be appreciated that augmenting the reaction product gas with stored inert gas, in addition to diluting the products of reaction, also serves to produce an inflation gas having a lower temperature than the reaction product gas alone. Thus, the inclusion of such an inert gas storage chamber can better ensure that the gas released from such an inflator assembly will be at a relatively low temperature and that the so released gas will have no more than acceptable lower concentrations of particular possible reaction products such as CO and $CO_2$.

Figure 3:
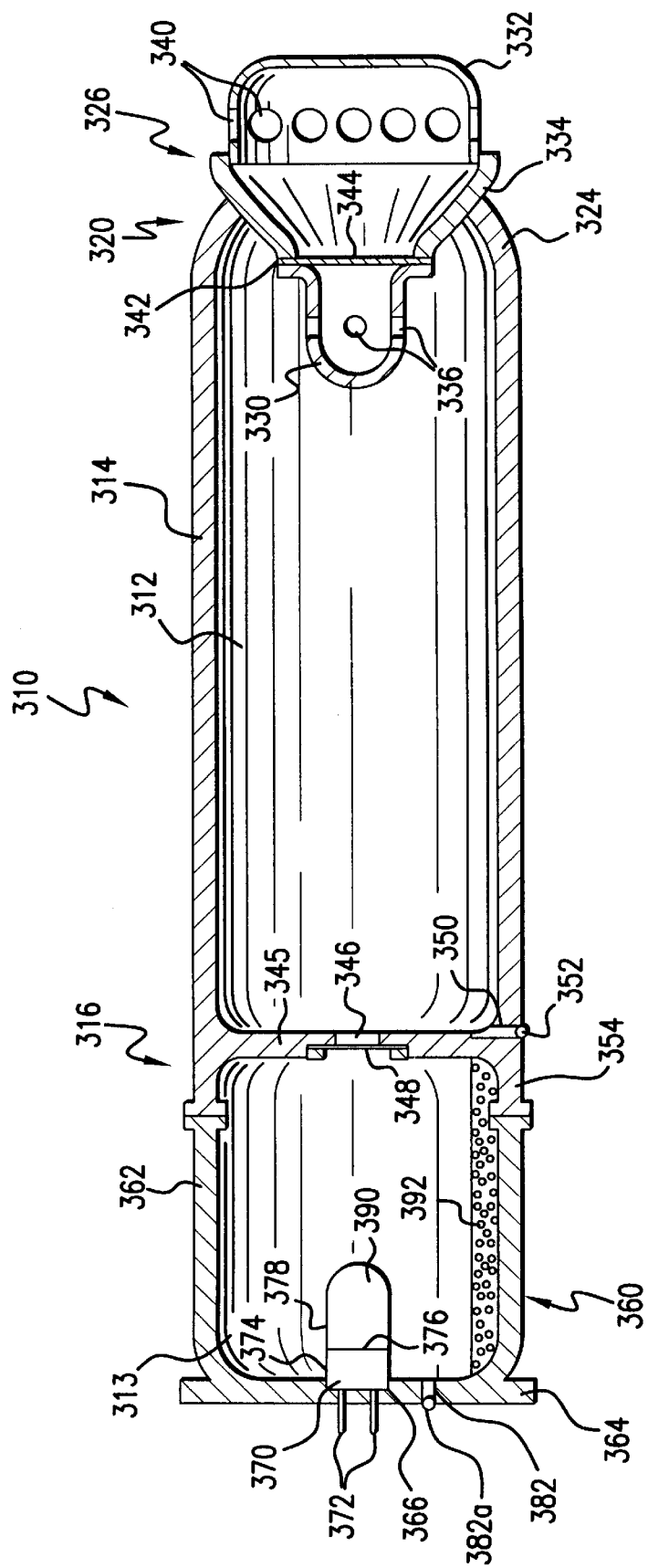

FIG. 3 illustrates an acetylene-based passenger side airbag inflator 310 in accordance with a third embodiment of the invention. The inflator assembly 310, similar to the inflator assembly 210 described above includes a gas storage chamber 312 and a reaction chamber 313. Similar to the chamber 212 described above, the chamber 312 is defined by an elongated generally cylindrical sleeve 314, having a first end 316 and a second end 320. The second end 320 is partially closed by means of a shoulder portion 324 integral (i.e., formed continuous with and in one piece) with the sleeve 314.

A diffuser assembly 326 including a throttle portion 330 and a discharge end portion 332, each include a plurality of openings, 336 and 340, respectively, is attached in sealing relation to the shoulder portion 324 at the sleeve second end 320. A diffuser body portion 334 joins together the throttle portion 330 and a discharge end portion 332, with a burst disc 344 at the interface 342 serving, in the static state, to separate the contents of the chamber 312 from the associated airbag (not shown).

The assembly 310, similar to the assembly 210, also includes a radially extending end wall 345 having an opening 346 therein normally closed by sealing means, e.g., by means of a burst disc 348 secured and joined thereto in sealing relation such as is known in the art.

The sleeve 314 includes an opening 350 which serves as a fill port wherethrough fluid can be passed into the chamber 312. As in the above-described embodiment, in the completed assembly, the fill port opening 350 can be appropriately sealed or closed such as by means of a plug 352, such as known in the art.

The second chamber 313 is at the sleeve first end 316 and is formed by the joining together of the sleeve extending portion 354 with a combustion cup 360. The combustion cup 360 includes a generally cylindrically extending side wall 362 and a base wall 364. The base wall 364 includes an opening 366 therein, wherethrough an initiator device 370, such as described above, is attached in sealing relation, such as with a weld, crimping or other suitable hermetic seal, within the chamber assembly 313.

The initiator device 370 includes leads 372 and a body portion 374 having a discharge end or portion 376 wherefrom, upon receipt of an appropriate electrical signal, such a pyrotechnic charge-containing initiator device will emit a hot, particle-laden discharge.

Within the chamber 313, adjacent the initiator device discharge portion 376, there is a storage container 378 wherein is housed a supply of a first acetylene-producing reactant 390. The chamber 313 itself houses a supply of a second acetylene-producing reactant 392. In one embodiment, the first and second acetylene-producing reactants are calcium carbide and water, respectively, with the calcium carbide stored within the storage container 378.

In an alternative embodiment of the invention, it is the supply of water which is housed within the container while calcium carbide is housed in the chamber 313 itself.

The base wall 364 includes an opening 382 which serves as a fill port wherethrough fluid can be passed into the chamber 313. As shown, in the completed assembly, the fill port opening 382 is appropriately sealed or closed such as by means of a plug 382a, such as known in the art.

The chamber 313, similar to the chamber 12 of inflator assembly 10 shown in FIG. 1, in the at rest state, contains a supply of oxidant or oxidant-bearing gas, such as described above.

In operation, such as upon the sensing of a collision, an electrical signal is sent to the initiator device 370. The initiator device 370 functions and, when it is a pyrotechnic charge-containing initiator, discharges high temperature combustion products towards the storage container 378, resulting in the rupturing or opening thereof and the release of the first acetylene-producing reactant 390 which then contacts and reacts with the second acetylene-producing reactant 392 to form acetylene. Residual heat resulting from the discharge of the initiator device 370 serves to ignite acetylene so produced, resulting in a rapid pressure rise within the reaction chamber 313. When the gas pressure within the reaction chamber 313 exceeds the structural capability of the burst disc 348, the disc ruptures or otherwise permits the passage of the reaction products into the gas storage chamber 312.

The passage of the reaction products into the gas storage chamber 312 serves to increase both the temperature and the relative amount of gaseous products within the gas storage chamber. Operation of the inflator assembly 310 is thereafter generally similar to that of inflator assembly 210 described above. Specifically, when the gas pressure within the gas storage chamber 312 exceeds the structural capability of the burst disc 344, the disc ruptures or otherwise permits the passage of the heated and hence expanded stored gas as well as reaction products or other material passed into the gas storage chamber 312 from the reaction chamber 313 into the associated airbag.

It will be understood that with inflator assemblies of the invention, such as described above, the evolution of acetylene from the reaction between calcium carbide and water can be controlled by various factors including: the relative amount of the reactants water and calcium carbide, the pressure and temperatures of the reactants, the selected particle size of the calcium carbide, and the drop size of the water (if a water spray is utilized). It will be appreciated that one or more of these variables can be controlled to advantageously vary the rate at which acetylene is formed within the inflator assemblies of the invention. Thus, the maximum internal pressure generated within such inflator assemblies can desirably be appropriately limited.

In addition, in accordance with certain embodiments of the invention, specific inflator assemblies and methods of operation of the invention may rely on control or moderation of the combustion reaction of the formed acetylene. For example and as will be described in greater detail below, particular embodiments of the invention rely on the inclusion of physical means to moderate the combustion reaction of the formed acetylene.

One particular technique whereby a subject inflator assembly produces a relatively low maximum pressure within the inflator involves a relatively slow evolution of acetylene from the reaction of calcium carbide with water, in conjunction with the inflator constituting a relatively long reaction or combustion chamber wherein the formed acetylene is in turn burned. With such inflator assemblies, the fuel, i.e., acetylene, is more slowly formed or released for the combustion reaction. The long combustion chamber, in turn, generally results in prolonged residence times for the fuel therein and thus better assures more complete combustion of the fuel.

Further, it is possible to make such inflators which desirably produce inflation gas in a manner which results in the associated airbag initially inflating in a more gradual manner, soon followed by the passage of inflation gas into the airbag at a relatively greater increased rate. An inflator resulting in such inflation characteristics is commonly referred to in the field as producing inflation gas in accordance with an "S" curve.

Figure 4:
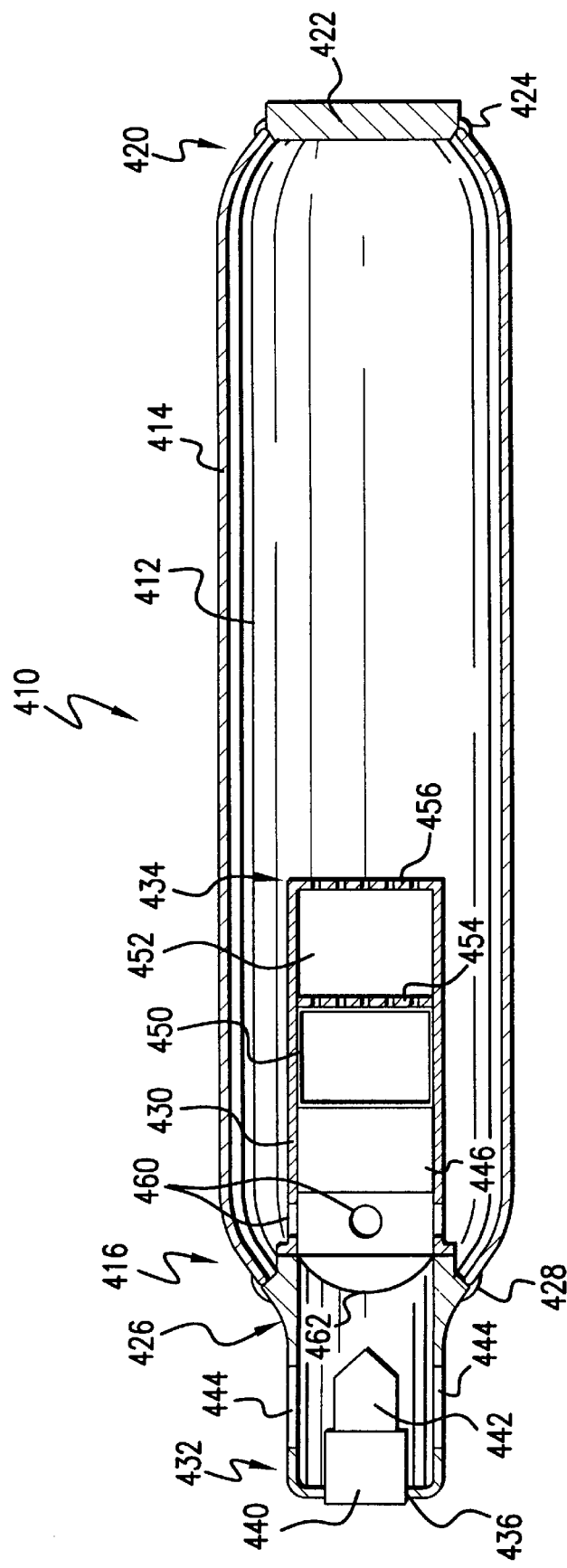
Figure 5:
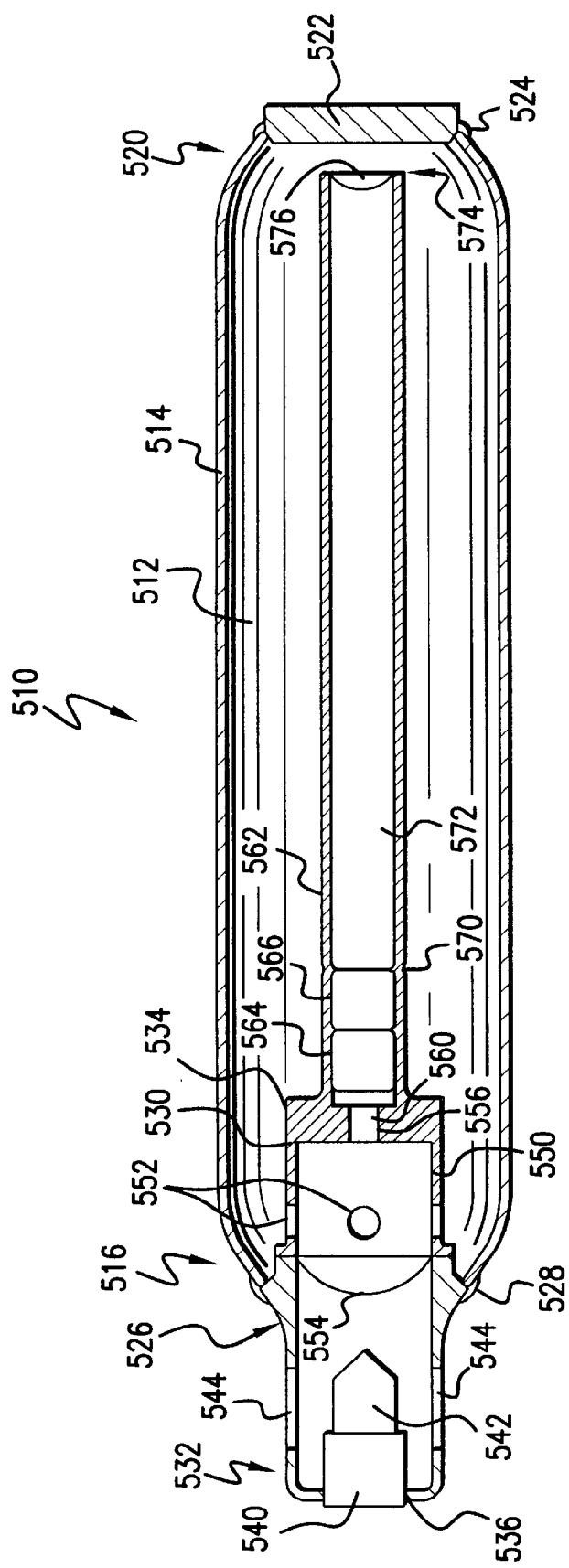

FIGS. 4 and 5 illustrate alternative embodiments of acetylene fueled passenger side airbag inflator assemblies, generally referred to as assemblies 410 and 510, respectively. These assemblies produce a relatively low maximum pressure within the inflator and inflation gas in a manner which results in the associated airbag initially inflating in a more gradual manner, soon followed by the passage of inflation gas into the airbag at a relatively greater increased rate.

The inflator assembly 410 includes a chamber 412 defined in part by an elongated generally cylindrical sleeve or bottle 414 having tapered first and second ends, 416 and 420, respectively. The second end 420 is closed by means of an end plug or closure 422 attached thereto in sealing relation such as by means of a weld 424.

Similar to the inflator assemblies described above, the chamber 412 in the at rest state, contains a supply of oxidant or oxidant-bearing gas, such as described above.

An inflator component assembly 426 is attached in sealing relation to the sleeve first end 416 by means of a weld 428. The inflator component assembly 426 is defined in part by an elongated generally cylindrical sleeve 430. The sleeve 430 includes first and second end portions, generally designated by the reference numerals 432 and 434, respectively. The first end portion 432 generally extends outside beyond the chamber 412 and includes an end opening 436 wherethrough an initiator device 440 is attached in sealing relation. Adjacent the initiator device 440 there is housed a projectile 442. The first end portion 432 also includes a plurality of openings 444 wherethrough inflation gas from the inflator assembly 410 can be passed into an associated airbag (not shown).

The second end portion 434 houses a piston 446, a container 450 containing a supply of a first acetylene producing reactant, e.g., water, and a chamber 452 containing a supply of a second acetylene producing reactant, e.g., calcium carbide. The chamber 452 includes perforated first and second side walls 454 and 456, respectively. In addition, the second end portion 434 includes a plurality of openings 460 wherethrough inflation gas from the inflator assembly chamber 412 can be passed.

Separating the first end portion 432 from the second end portion 434 and normally preventing flow passage out from the second end portion 434 to the first end portion 432 is a burst disc 462.

In operation, such as upon the sensing of a collision, an electrical signal is sent to the initiator device 440. The initiator device 440 functions to project the projectile 442 to or through the burst disc 462, contacting the piston 446. The passage of the projectile 442 into or through the burst disc 462 results in the opening of the burst disc 462, permitting the flow of material from the chamber 412 through the openings 460, through the ruptured burst disc 462 and out the openings 444 into the associated airbag.

The force applied to the piston 446 as a result of operation by the projectile 442, results in the piston 446 acting against the container 450 resulting in the rupture or otherwise opening of the container 450 and the passage of at least a portion of the water contained therein passing through the first perforated wall 454 into the chamber 452 wherein this water contacts the calcium carbide housed within the chamber 452.

The released calcium carbide and released water react to form acetylene. The so produced acetylene contacts and mixes the oxidant stored within the chamber 412 with the residual heat resulting from the discharge of the initiator device 440 igniting this mixture to produce additional inflation gas which in turn is passed out through the openings 460, through the ruptured burst disc 462 and out the openings 444 into the associated airbag.

It will be appreciated that the perforated side wall 456 separating the chamber 452 from the oxidant-containing chamber 412 can constitute a physical means to moderate the combustion reaction of the formed acetylene, such as identified above. More specifically, such a perforated side wall can be utilized to meter contact between the combustion oxidant and the formed acetylene.

The inflator assembly 510 illustrated in FIG. 5, similar to the inflator assembly 410 described above, includes a chamber 512 defined in part by an elongated generally cylindrical sleeve or bottle 514 having tapered first and second ends, 516 and 520, respectively. The second end 520 is closed by means of an end plug or closure 522 attached thereto in sealing relation such as by means of a weld 524.

Similar to the inflator assemblies described above, the chamber 512 in the at rest state, contains a supply of oxidant or oxidant-bearing gas, such as described above.

An inflator component assembly 526 is attached in sealing relation to the sleeve first end 516 by means of a weld 528. The inflator component assembly 526 is defined in part by an elongated generally cylindrical sleeve 530. The sleeve 530 includes first and second end portions, generally designated by the reference numerals 532 and 534, respectively. As with the inflator assembly 410 described above, the first end portion 532 generally extends outside beyond the chamber 512 and includes an end opening 536 wherethrough an initiator device 540 is attached in sealing relation. Adjacent the initiator device 540 there is housed a projectile 542. The first end portion 532 also includes a plurality of openings 544 wherethrough inflation gas from the inflator assembly 510 can be passed into an associated airbag (not shown).

The second end portion 534 includes a passage chamber 550 which has a plurality of openings 552 wherethrough inflation gas from the inflator assembly chamber 512 can be passed.

Separating the first end portion 532 from the second end portion 534 and normally preventing flow passage out from the second end portion 534 to the first end portion 532 is a burst disc 554.

Adjacent the passage chamber 550 is a storage chamber 556 containing a supply of an appropriate primer material 560. Various primer materials including small arms ammunitions primer such as lead styphnate and tetracene, are well known in the art and can, if desired, be appropriately utilized in the practice of the invention.

Extending from the second end portion 534 is a cylindrical tubular sleeve 562 of a reduced diameter. The sleeve 562 houses, adjacent the primer storage volume 556, a first container 564 wherein is housed a supply of water. Adjacent the first storage container 564, generally opposite the primer storage volume 556, there is a second storage container 566 wherein is housed a supply of calcium carbide. It will be appreciated that such calcium carbide and water storage containers may, for example, be in the form of separated or joined structures or a one piece structure, as may be desired. The sleeve 562 can, for example, be appropriately crimped so as to secure the containers therein, with sleeve 562 having a crimp 570 therein.

The sleeve 562 extends beyond the crimp 570 to form a reaction or combustion chamber 572 having an end 574 normally closed by a burst disc 576. In the normal, at rest state, the reaction chamber 572 houses or contains an oxidant-containing gas.

In operation, such as upon the sensing of a collision, an electrical signal is sent to the initiator device 540. The initiator device 540 functions to project the projectile 542 to or through the burst disc 554. The passage of the projectile 542 into or through the burst disc 554 results in the opening of the burst disc 554, permitting the flow of material from the chamber 512 through the openings 552, through the ruptured burst disc 554, and out the openings 544 into the associated airbag.

Subsequent to contacting the burst disc 554, the projectile 542 contacts and ignites the primer material 560. The ignited primer material then acts against the first and second containers 564 and 566, respectively. The rupturing or opening of the first storage container 564 results in the release of water therefrom. The rupturing or opening of the second storage container 566 results in the release of calcium carbide therefrom.

The released calcium carbide and released water react to form acetylene. The so produced acetylene contacts and mixes the oxidant stored within the chamber 572 with the residual heat resulting from the discharge of the initiator device 540 igniting this mixture to produce additional inflation gas, resulting in a rapid pressure rise within the reaction chamber 572.

When the gas pressure within the reaction chamber 572 exceeds the structural capability of the burst disc 576, the disc ruptures or otherwise permits the passage of the reaction products into the gas storage chamber 512. These reaction product can serve to further heat the gas remaining within the chamber 512, resulting in the further expansion thereof with the resulting gases in turn being passed out through the openings 552, through the ruptured burst disc 554 and out the openings 544 into the associated airbag.

It will be appreciated that the elongated tube 562 wherein the formed acetylene and the combustion oxidant contact and react can constitute a physical means to moderate the combustion reaction of the formed acetylene, such as identified above. More specifically, such an elongated tube can, as will be appreciated by those skilled in the art, be utilized to meter contact between the combustion oxidant and the formed acetylene as the tube can serve to restrict contact between the formed acetylene and the supply of combustion oxidant.

The present invention is described in further detail in connection with the following example which illustrates or simulates various aspects involved in the practice of the invention. It is to be understood that all changes that come within the spirit of the invention are desired to be protected and thus the invention is not to be construed as limited by this example.

EXAMPLE

The acetylene-based airbag inflator concept was experimentally verified using a heavyweight, reusable test fixture to simulate a side impact-sized, two chamber airbag inflator assembly generally similar to the inflator assembly 310, described above.

The test assembly included a reaction chamber and a stored gas chamber having volumes set at 1.53 in$^3$ (25.1 cc) and 4.2 in$^3$ (68.8 cc), respectively. Such volumes are typical of those used in side impact applications.

Within the reaction chamber, 1.0 g of water was stored in a small container immediately adjacent the discharge end of a standard 400 mg ZPP (zirconium potassium perchlorate) initiator. The water was held within the storage container by a burst disc having a diameter of 0.375 inch (9.5 mm) and a thickness of 0.008 in (0.2 mm). The calcium carbide ($CaC_2$, 1.80 g) stored within the reaction chamber and used in conjunction with water to generate acetylene, was held loosely as a powder (particle size of about 40–100 mesh) within the reaction chamber, generally lying on the bottom wall of the reaction chamber. The reaction chamber itself initially held 3.93 g of a gaseous mixture of 77% oxygen and 23% helium (dry, molar basis). The resulting pressure in the reaction chamber was 2180 psi (15.0 MPa) at the ambient test temperature (21° C.).

The stored gas chamber was filled with a mixture of 95% argon and 5% helium (molar basis), which resulted in an initial pressure of 4000 psi (27.6 MPa). The burst disc used to separate the contents of the reaction chamber from the contents of the stored gas chamber measured 0.375 inches (9.8 mm) in diameter, with a thickness of 0.01 inches (0.25 mm). The burst disc used to hold the stored gas contents within the inflator was 0.25 inches (6.35 mm) in diameter and also 0.01 inches (6.35 mm) thick.

Pressure transducers were mounted in the sides of the fixture to permit dynamic (real-time) pressure measurements within the reaction and stored gas chambers. The test inflator was fired into a 60 liter closed tank, which was also equipped a pressure transducer.

Discussion of Results

Figure 6:
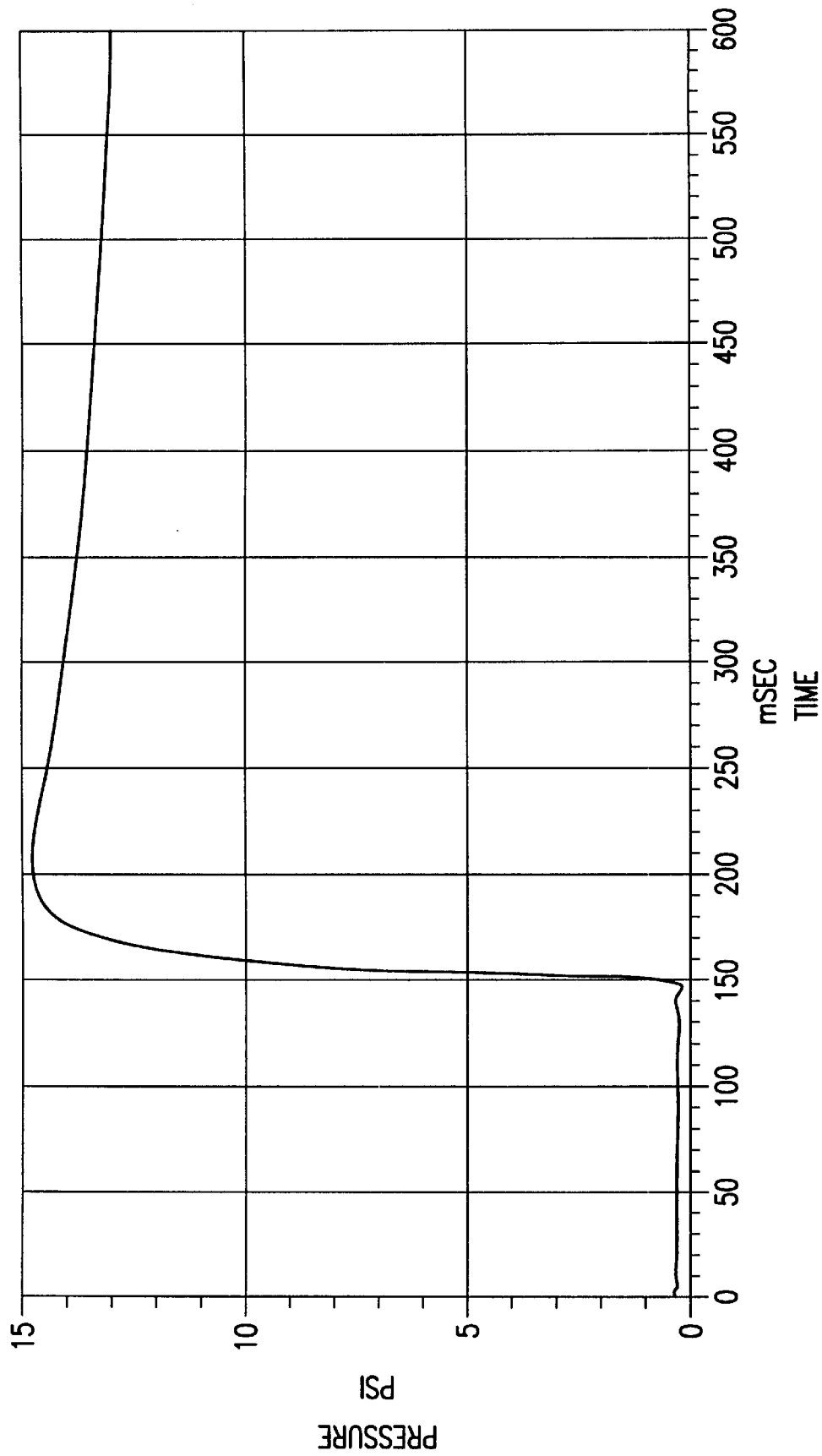
FIGS. 6, 7 and 8 show the tank, combustion chamber and stored gas chamber pressures as a function of time performances realized for the inflator assembly utilized in the Example.
Figure 7:
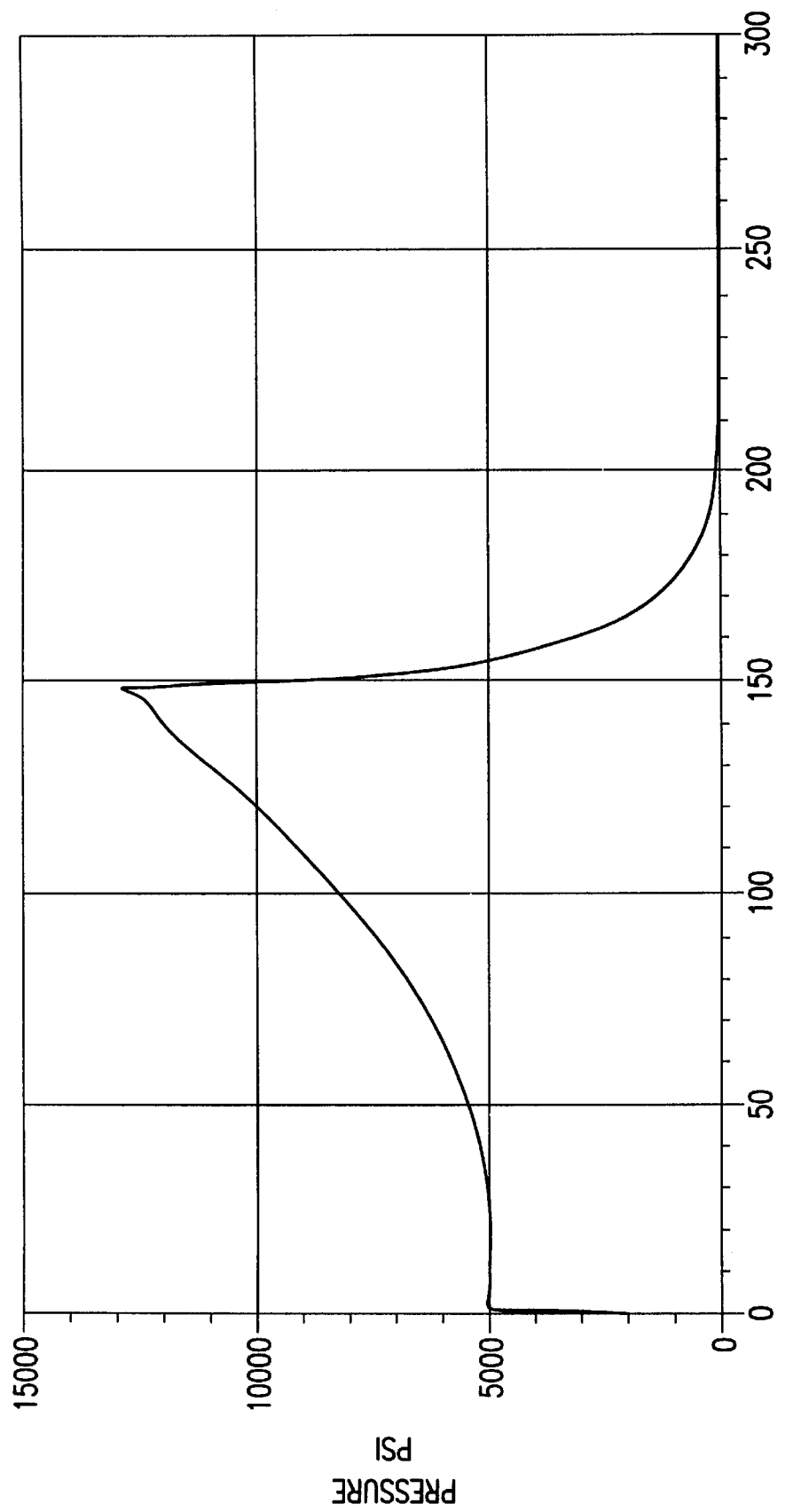

As shown in FIGS. 6–9, the test inflator was successfully deployed—as indicated by the generation of positive pressure within the 60 liter test tank. Thus, the concept of the internal generation of fuel, and its subsequent combustion within an inflation device, was successfully demonstrated. The pressure as recorded in the 60 liter test tank is illustrated in FIG. 6. Although the generation of positive pressure was indicative of a successful inflator deployment, the actual pressure curve was characterized by a long delay between when the initiator was fired and positive pressure was recorded in the test tank (about 150 ms). In practice, such a delay would generally be considered unacceptable for airbag applications. As discussed below, however, such a delay can be relatively easily reduced and minimized.

The delay between ignition of the initiator and gas flowing from the inflator is believed to be largely a result of the method used to hold the reactants (calcium carbide and water) within the test inflator, wherein the calcium carbide was held loosely in the bottom of the reaction chamber, while the water was held immediately adjacent to the initiator. Thus, upon functioning of the initiator associated with operation of the test inflator, hot initiator combustion products were discharged into the water, resulting in the heating atomization and discharge of water from the water storage container into the reaction chamber. As the hot water and initiator combustion products were discharged, they apparently did not react immediately with the stored calcium carbide. In other words, the mixing of the reactants was not immediate, and therefore a relatively long period of time elapsed prior to the generation of the acetylene fuel. This is easily seen in FIG. 7, where the relatively slow pressure rise was indicative of the rate of the combustion process being limited by the rate of production of the fuel.

The slow rate of fuel production was not necessarily unexpected considering the particular reactant storage arrangement utilized in the test inflator. To increase the rate of fuel production, it would be more advantageous to hold the calcium carbide in a manner that would allow it to immediately mix with the discharged water. For example, the performance of the inflator can become more rapid if the calcium carbide was held in a small packet near the initiator.

Figure 8:
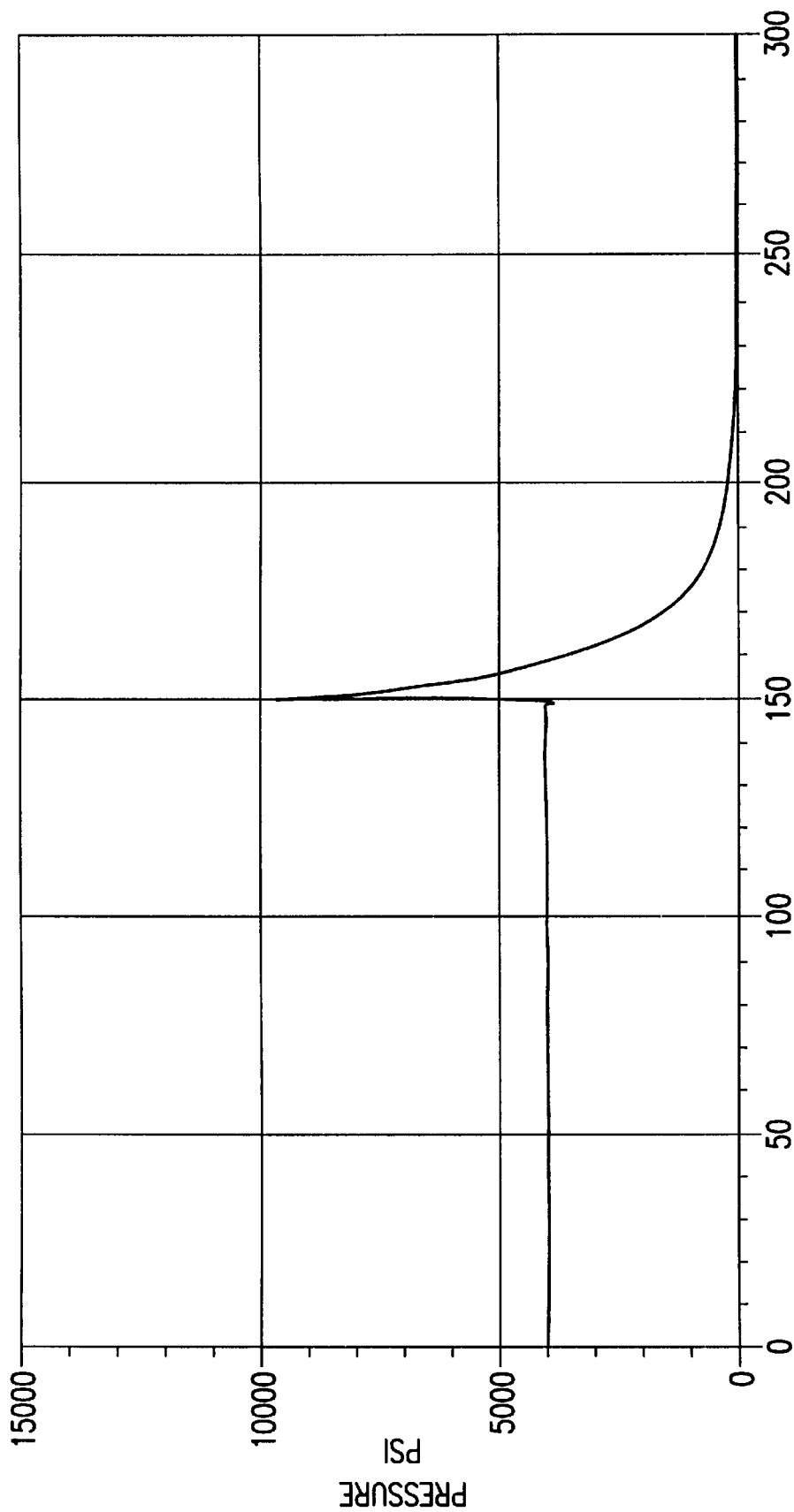
Figure 9:
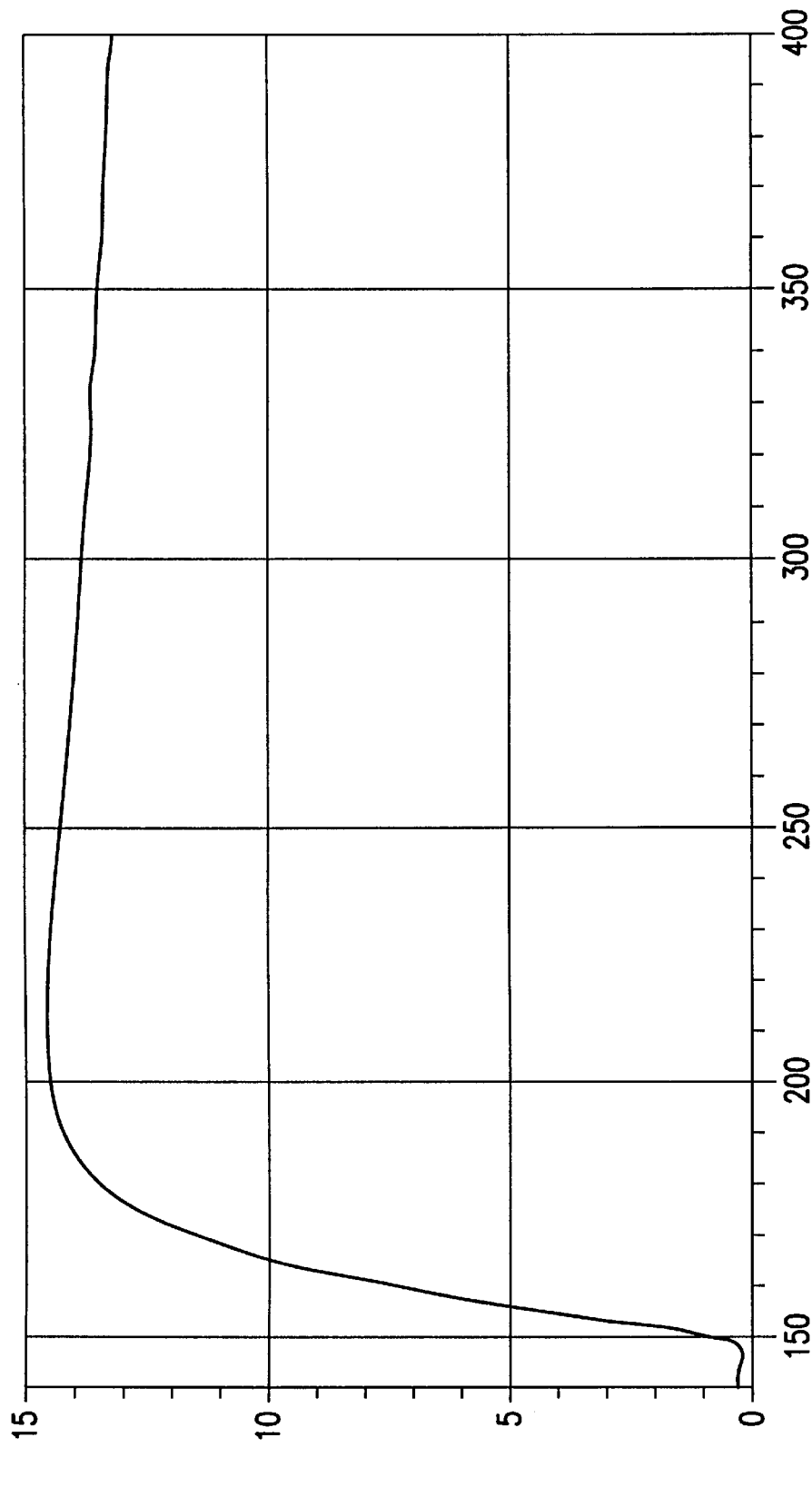
FIG. 9 shows the tank pressure as a function of time obtained for the inflator assembly of the Example, without showing the initial delay.

Once sufficient pressure was generated within the reaction chamber to burst the rupture disc separating the reaction chamber from the stored gas chamber, inflator operation was very rapid. As shown in FIG. 6, the reaction chamber burst disc failed slightly before 150 ms. As shown in FIG. 8, the stored gas chamber burst disc failed immediately thereafter, at a pressure of about 8000 psi (55.2 MPa). Once gas escaped from the inflator, the rate and magnitude of gas release was approximately that necessary for a side impact application, as seen in FIG. 9. In FIG. 9, the long (150 ms) delay period has been eliminated from the plot in order to more clearly show the inflation curve. Note that once gas began to flow from the inflator, the maximum pressure was reached very quickly—in about 60 ms. While this time period to maximum pressure may have been a little too slow for a side impact application (about 40 ms might be more desirable), such time period can be easily adjusted by simply increasing the diameter of the throttling orifice. Also, the maximum tank pressure can, if desired, be easily reduced such as by reducing the gas loads within the inflator, particularly the load of stored gas within the stored gas chamber.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable device, said apparatus comprising:

a first chamber containing a supply of calcium carbide, a supply of water and a supply of a combustion oxidant, and wherein at least a portion of said supply of calcium carbide and at least a portion of said supply of water react to form acetylene when said apparatus is actuated, with at least a portion of the formed acetylene reacting to produce at least one gaseous product species, at least a portion of the at least one gaseous product species being released from said first chamber for inflating the inflatable device and wherein at least a portion of the formed acetylene contacts at least a portion of said supply of combustion oxidant and burns to produce the at least on gaseous product species.

2. The apparatus of claim 1 wherein at least a portion of the formed acetylene decomposes to produce at least a second gaseous product species, at least a portion of the at least the second gaseous product species also being released from said first chamber for inflating the inflatable device.

3. The apparatus of claim 1 wherein said first chamber includes a first storage container containing said supply of water, said apparatus additionally comprises an initiator device sufficiently adjacent said first storage container such that, upon activation, said initiator device produces a sufficient quantity of initiation products directed towards said first storage container that said first storage container opens to permit contact between at least a portion of said supply of calcium carbide and at least a portion of said supply of water.

4. The apparatus of claim 1 wherein said first chamber includes a first storage container containing said supply of calcium carbide, said apparatus additionally comprises an initiator device sufficiently adjacent said first storage container such that, upon activation, said initiator device produces a sufficient quantity of initiation products directed towards said first storage container that said first storage container opens to permit contact between at least a portion of said supply of calcium carbide and at least a portion of said supply of water.

5. The apparatus of claim 4 wherein said first chamber also includes a second storage container containing said supply of water adjacent said first storage container, and wherein, upon activation, said initiator device produces a sufficient quantity of initiation products directed towards said first and second storage containers such that said storage containers open to permit contact between at least a portion of said supply of calcium carbide and at least a portion of said supply of water.

6. The apparatus of claim 1 wherein said first chamber is adapted to open when a predetermined increase in pressure within said first chamber is realized and wherein a sufficient quantity of the at least one gaseous product species is produced whereby said first chamber is opened.

7. The apparatus of claim 1 additionally comprising a second chamber containing a supply of pressurized stored gas, said second chamber in fluid communication with said first chamber upon the opening of said first chamber with the at least a portion of the at least one gaseous product released from said first chamber mixing with the pressurized stored gas to produce inflation gas and increasing the pressure within said second chamber, said second chamber adapted to open when a predetermined increase in pressure within said second chamber is realized, whereby at least a portion of the inflation gas is released from said second chamber to inflate the inflatable device.

8. The apparatus of claim 1 additionally comprising physical means to moderate the combustion reaction of the formed acetylene.

9. The apparatus of claim 8 wherein said physical means to moderate the combustion reaction of the formed acetylene comprises a passage member separating at least a portion of said combustion oxidant from the formed acetylene, said passage member having a plurality of ports passing therethrough to permit a metered contact between the at least separated portion of the combustion oxidant and the formed acetylene.

10. The apparatus of claim 8 wherein said physical means to moderate the combustion reaction of the formed acetylene comprises said first chamber having the form of an elongated tube wherein the formed acetylene and said combustion oxidant contact and react.

11. The apparatus of claim 10 additionally comprising a second chamber containing a supply of pressurized stored gas, said second chamber in fluid communication with said first chamber upon the opening of said first chamber with the at least a portion of the at least one gaseous product released from said first chamber mixing with at least a portion of said supply of pressurized stored gas to produce inflation gas and increasing the pressure within said second chamber, said second chamber adapted to open when a predetermined increase in pressure within said second chamber is realized, whereby at least a portion of the inflation gas is released from said second chamber to inflate the inflatable device.

12. A method for inflating an inflatable safety device, said method comprising the steps of:

reacting calcium carbide and water in a first chamber of an inflation apparatus additionally containing a supply of a combustion oxidant to form acetylene, reacting at least a portion of the formed acetylene to produce at least one gaseous product species, with at least a portion of the formed acetylene burning to produce at least a portion of the at least one gaseous product species, and releasing at least a portion of the at least one gaseous product species from the inflation apparatus to inflate the inflatable safety device.

13. The method of claim 12 wherein at least a portion of the formed acetylene decomposes to produce at least a second gaseous product species also released from the first chamber.

14. The method of claim 12 wherein the first chamber includes a first storage container containing the water and wherein an initiator device is actuated to produce a sufficient quantity of initiation products diresтуред towards the first storage container to open the first storage container whereby the calcium carbide and the water are in contact.

15. The method of claim 12 wherein the first chamber includes a first storage container containing the water and wherein an initiator device is actuated to produce a sufficient quantity of initiation products directed towards the first storage container to open the first storage container whereby the calcium carbide and the water are placed in contact.

16. The method of claim 15 wherein the first chamber also includes a second storage container containing the water and wherein the initiator device is actuated to produce a sufficient quantity of initiation products directed towards the first and second storage containers to open the first and second storage containers whereby the calcium carbide and the water are placed in contact.

17. The method of claim 12 comprising the step of opening the first chamber when a predetermined increase in pressure within the first chamber is realized whereby at least a portion of the at least one gaseous product species is expelled from the first chamber.

18. The method of claim 12 wherein the apparatus includes a second chamber containing a supply of pressurized stored gas, the second chamber being in fluid communication with the first chamber upon the opening of the first chamber, said method additionally comprising the steps of:

mixing at least a portion of the at least one gaseous product released from the first chamber with the pressurized stored gas to produce inflation gas and increasing the pressure within the second chamber; and opening the second chamber when a predetermined increase in pressure within the second chamber is realized to release at least a portion of the inflation from the second chamber to inflate the inflatable device.

19. The method of claim 12 wherein contact between the formed acetylene and the supply of combustion oxidant is physically restricted.

20. The method of claim 19 wherein the formed acetylene is passed through a plurality of ports of a passage member separating at least a portion of the combustion oxidant from the formed acetylene.

21. The method of claim 19 wherein the first chamber wherein the formed acetylene and the combustion oxidant contact and react is in the form of an elongated tube.

22. The method of claim 21 wherein the apparatus includes a second chamber containing a supply of pressurized stored gas, the second chamber being in fluid communication with the first chamber upon the opening of the first chamber, said method additionally comprising the steps of:

mixing at least a portion of the at least one gaseous product released from the first chamber with the pressurized stored gas to produce inflation gas and increasing the pressure within the second chamber; and opening the second chamber when a predetermined increase in pressure within the second chamber is realized to release at least a portion of the inflation from the second chamber to inflate the inflatable device.

* * * * *